United States Patent
Turquais et al.

(10) Patent No.: US 10,436,924 B2
(45) Date of Patent: Oct. 8, 2019

(54) DENOISING SEISMIC DATA

(71) Applicant: PGS Geophysical AS, Oslo (NO)

(72) Inventors: Pierre Turquais, Oslo (NO); Endrias Asgedom, Oslo (NO); Walter Franz Söllner, Oslo (NO)

(73) Assignee: PGS Geophysical AS, Oslo (NO)

( * ) Notice: Subject to any disclaimer, the term of this patent is extended or adjusted under 35 U.S.C. 154(b) by 394 days.

(21) Appl. No.: 15/265,072

(22) Filed: Sep. 14, 2016

(65) Prior Publication Data
US 2017/0108604 A1 Apr. 20, 2017

Related U.S. Application Data

(60) Provisional application No. 62/241,244, filed on Oct. 14, 2015.

(51) Int. Cl.
*G01V 1/36* (2006.01)
*G01V 1/38* (2006.01)

(52) U.S. Cl.
CPC .............. *G01V 1/364* (2013.01); *G01V 1/38* (2013.01); *G01V 2210/121* (2013.01); *G01V 2210/1293* (2013.01); *G01V 2210/1423* (2013.01); *G01V 2210/324* (2013.01); *G01V 2210/34* (2013.01); *G01V 2210/48* (2013.01)

(58) Field of Classification Search
CPC .... G01V 1/364; G01V 1/38; G01V 2210/121; G01V 2210/1293; G01V 2210/1423; G01V 2210/324; G01V 2210/34; G01V 2210/48
See application file for complete search history.

(56) References Cited

U.S. PATENT DOCUMENTS

| | | | |
|---|---|---|---|
| 9,201,154 B2 | 12/2015 | Poole et al. | |
| 2013/0121109 A1* | 5/2013 | Baardman | G01V 1/36 367/24 |
| 2015/0236668 A1* | 8/2015 | Poole | H03H 17/0248 17/248 |

OTHER PUBLICATIONS

Aharon, et al., "K-SVD: An algorithm for designing overcomplete dictionaries for sparse representation", IEEE Transactions on Signal Processing, vol. 54, No. 11, ( Nov. 2006) (12 pgs).
Beckouche, et al., "Simultaneous dictionary learning and denoising for seismic data", Geophysics, vol. 79, No. 3, (May 8, 2014) (6 pgs).
Engan, et al., "Method of optimal directions for frame design", IEEE International Conference, vol. 5, (1999) (4 pgs).
Donoho, et al., "Ideal spatial adaptation by wavelet shrinkage"; Biometrika, vol. 81, (1994) (31 pgs).

(Continued)

*Primary Examiner* — Sujoy K Kundu
*Assistant Examiner* — Lynda Dinh (57) ABSTRACT

Denoising seismic data can include extracting a first plurality of overlapping patches corresponding to a respective seismic data window selected from a plurality of seismic data windows, reshaping the first plurality of overlapping patches into patch vectors, and determining sparse approximations of the patch vectors based on a dictionary and a sparse coefficient vector. Denoising seismic data can also include reshaping the sparse approximations into a respective second plurality of overlapping patches, and constructing a denoised version of at least one of the plurality of seismic data windows using the respective second plurality overlapping patches.

24 Claims, 7 Drawing Sheets

(56) References Cited

OTHER PUBLICATIONS

Pati, et al., "Orthogonal matching pursuit: recursive function approximation with applications to wavelet decomposition"; Proceedings of the 27th Annual Asilomar Conference on Signals, Systems, and Computers (Nov. 1-3, 1993) (5 pgs).

Oropeza, et al., "The Singular Spectrum Analysis method and its application to seismic data denoising and reconstruction"; (Fall 2010) (102 pgs) https://saig.physics.ualberta.ca/lib/exe/fetch.php?media=publications:theses:2010fall_vincente_msc.pdf.

Zhu, et al., "Seismic data denoising through multiscale and sparsity-promoting dictionary learning"; Geophysics, vol. 80, No. 6 (Aug. 28, 2015) (13 pgs) http://cegp.ece.gatech.edu/publications/journal/Zhu_Geo2015.pdf.

* cited by examiner

DENOISING SEISMIC DATA

CROSS-REFERENCE TO RELATED APPLICATIONS

This application claims priority to U.S. Provisional Application 62/241,244 filed Oct. 14, 2015, which is incorporated by reference.

BACKGROUND

In the past few decades, the petroleum industry has invested heavily in the development of marine survey techniques that yield knowledge of subterranean formations beneath a body of water in order to find and extract valuable mineral resources, such as oil. High-resolution images of a subterranean formation are helpful for quantitative interpretation and improved reservoir monitoring. For a typical marine survey, a marine survey vessel tows one or more sources below the sea surface and over a subterranean formation to be surveyed for mineral deposits. Receivers can be located on or near the seafloor, on one or more streamers towed by the marine survey vessel, or on one or more streamers towed by another vessel. The marine survey vessel typically contains marine survey equipment, such as navigation control, source control, receiver control, and recording equipment. The source control can cause the one or more sources, which can be air guns, marine vibrators, electromagnetic sources, etc., to produce signals at selected times. In some instances, each signal is essentially a wave called a wavefield that travels down through the water and into the subterranean formation. At each interface between different types of rock, a portion of the wavefield can be refracted, and another portion can be reflected, which can include some scattering, back toward the body of water to propagate toward the sea surface. The receivers thereby measure a wavefield that was initiated by the actuation of the source. In some instances, each signal is essentially a field that is imparted into the subterranean formation, which can induce a different field in response. The receivers can measure the different field that was induced by the actuation of the source.

DETAILED DESCRIPTION

The present disclosure is related to denoising seismic data, for instance in seismic data windows. As used herein, denoising seismic data can include reducing, attenuating, and/or eliminating noise from seismic data. As used herein, noise can refer to relatively persistent vibration that is a non-interpretable or unwanted component of signals recorded by receivers. Some approaches to denoising include removing constant, Gaussian noise. In signal processing, the noise changes neither in its image nor in its intensity. These signal processing approaches, in contrast to the present disclosure, do not apply to seismic data processing, which can include noise changing in time or space and from trace to trace. For instance, in seismic data processing, noise can change based on inconsistent and/or faulty receivers, etc., among other factors. This changing noise can be referred to herein as noise having spatio-temporally varying variance because the intensity of the noise can vary both in time and space.

In at least one embodiment of the present disclosure, coherence-based dictionary learning and denoising (CDLD) can be used for attenuating noise having a spatio-temporally varying variance. Dictionaries, as used herein, include a set of signals called atoms describing elementary features and can be locally trained to capture a morphology associated with seismic data. Unlike random noise, seismic events in the data can be coherent with respect to learned dictionaries and can be represented with fewer atoms as compared to other approaches. Learned dictionaries, as used herein, can include dictionaries that have been updated iteratively to gradually improve the dictionary based on training vectors and/or other factors. By realizing a sparse approximation of seismic data subject to the learned dictionaries, random noise can be attenuated while preserving a signal. In at least one embodiment, a sparse optimization criterion can be based on coherence, which can allow for attenuation of random noise having a spatio-temporally varying variance in seismic data. As used herein, random noise comprises erratic seismic noise that may be incoherent in space and time and sometimes unpredictable. In at least one embodiment, the random noise may be generated by cable vibrations and/or wind motion, among others.

It is to be understood the present disclosure is not limited to particular devices or methods, which can, of course, vary. It is also to be understood that the terminology used herein is for the purpose of describing particular embodiments only, and is not intended to be limiting. As used herein, the singular forms "a", "an", and "the" include singular and plural referents unless the content clearly dictates otherwise. Furthermore, the words "may" and "can" are used throughout this application in a permissive sense (i.e., having the potential to, being able to), not in a mandatory sense (i.e., must). The term "include," and derivations thereof, mean "including, but not limited to." The term "coupled" means directly or indirectly connected. Bold letters are used for denoting vectors, and bold capital letters are used for denoting a matrix.

The figures herein follow a numbering convention in which the first digit or digits correspond to the drawing figure number and the remaining digits identify an element or component in the drawing. Similar elements or components between different figures can be identified by the use of similar digits. As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate certain embodiments of the present invention, and should not be taken in a limiting sense.

Figure 1:
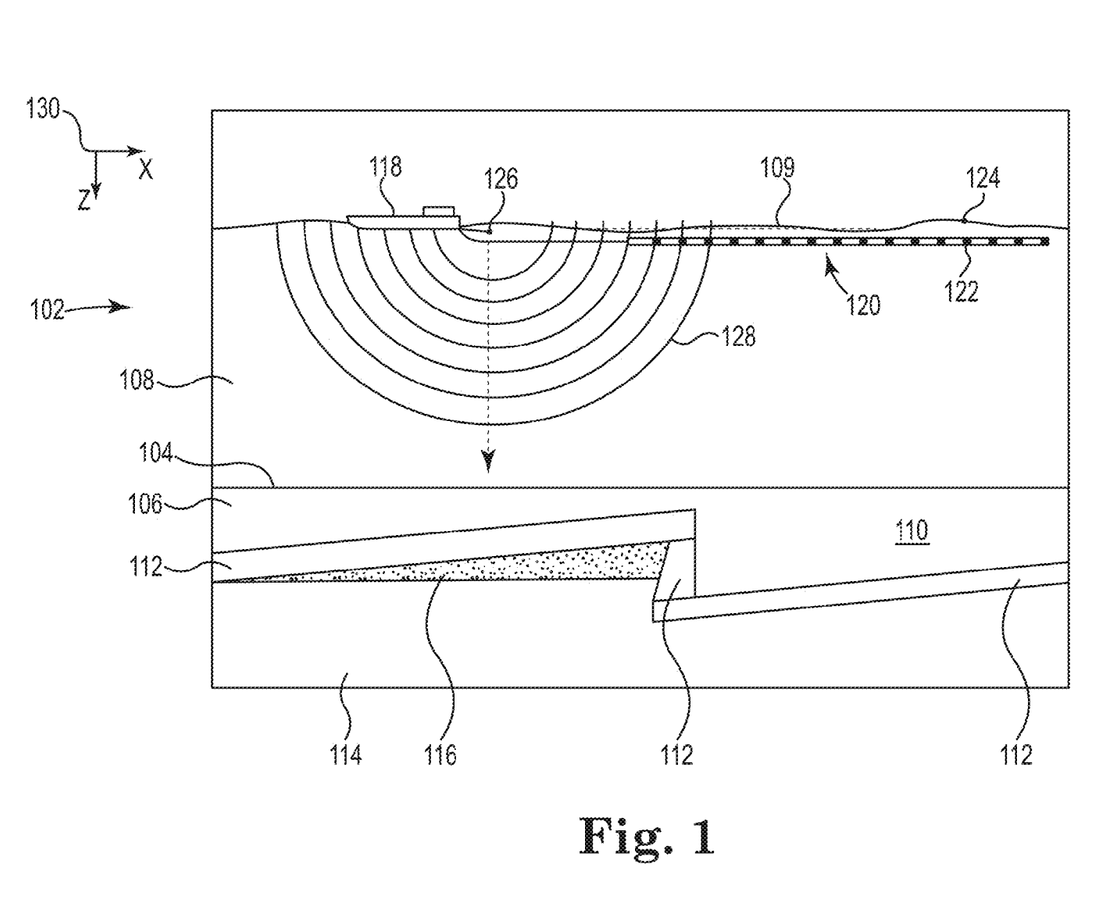
FIG. 1 illustrates an elevation or xz-plane view of marine surveying in which signals are emitted by a source for recording by receivers for processing and analysis in order to help characterize the structures and distributions of features and materials underlying the surface of the earth.

FIG. 1 illustrates an elevation or xz-plane 130 view of marine surveying in which signals are emitted by a source 126 for recording by receivers 122 for processing and analysis in order to help characterize the structures and distributions of features and materials underlying the surface of the earth. For example, such processing can include analogous processing of modeled and measured marine survey data. FIG. 1 shows a domain volume 102 of the earth's surface comprising a subsurface volume 106 of sediment and rock below the surface 104 of the earth that, in turn, underlies a fluid volume 108 of water having a sea surface 109 such as in an ocean, an inlet or bay, or a large freshwater lake. The domain volume 102 shown in FIG. 1 represents an example experimental domain for a class of marine surveys. FIG. 1 illustrates a first sediment layer 110, an uplifted rock layer 112, second, underlying rock layer 114, and hydrocarbon-saturated layer 116. One or more elements of the subsurface volume 106, such as the first sediment layer 110 and the first uplifted rock layer 112, can be an overburden for the hydrocarbon-saturated layer 116. In some instances, the overburden can include salt.

FIG. 1 shows an example of a marine survey vessel 118 equipped to carry out marine surveys. In particular, the marine survey vessel 118 can tow one or more streamers 120 (shown as one streamer for ease of illustration) generally located below the sea surface 109. The streamers 120 can be long cables containing power and data-transmission lines (e.g., electrical, optical fiber, etc.) to which receivers can be coupled. In one type of marine survey, each receiver, such as the receiver 122 represented by the shaded disk in FIG. 1, comprises a pair of sensors including a geophone that detects particle displacement within the water by detecting particle motion variation, such as velocities or accelerations, and/or a hydrophone that detects variations in pressure. In one type of marine survey, each receiver, such as receiver 122, comprises an electromagnetic receiver that detects electromagnetic energy within the water. The streamers 120 and the marine survey vessel 118 can include sensing electronics and data-processing facilities that allow receiver readings to be correlated with absolute positions on the sea surface and absolute three-dimensional positions with respect to a three-dimensional coordinate system. In FIG. 1, the receivers along the streamers are shown to lie below the sea surface 109, with the receiver positions correlated with overlying surface positions, such as a surface position 124 correlated with the position of receiver 122. The marine survey vessel 118 can also tow one or more sources 126 that produce signals as the marine survey vessel 118 and streamers 120 move across the sea surface 109. Sources 126 and/or streamers 120 can also be towed by other vessels, or can be otherwise disposed in fluid volume 108. For example, receivers can be located on ocean bottom cables or nodes fixed at or near the surface 104, and sources 126 can also be disposed in a nearly-fixed or fixed configuration. For the sake of efficiency, illustrations and descriptions herein show receivers located on streamers, but it should be understood that references to receivers located on a "streamer" or "cable" should be read to refer equally to receivers located on a towed streamer, an ocean bottom receiver cable, and/or an array of nodes. Data collected by receivers is referred to herein as measured marine survey data. Before the marine survey data is processed, it is referred to as raw measured marine survey data.

FIG. 1 shows an expanding, spherical signal, illustrated as semicircles of increasing radius centered at the source 126, representing a down-going wavefield 128, following a signal emitted by the source 126. The down-going wavefield 128 is, in effect, shown in a vertical plane cross section in FIG. 1. The outward and downward expanding down-going wavefield 128 can eventually reach the surface 104, at which point the outward and downward expanding down-going wavefield 128 can partially scatter, can partially reflect back toward the streamers 120, and can partially refract downward into the subsurface volume 106, becoming elastic signals within the subsurface volume 106.

Some dictionary learning approaches can be used in seismic data processing. However, the recordings associated with these approaches can be redundant; for example, the same information is recorded several times. Dictionary learning can extract elementary signals from data and store them as atoms in a dictionary. Subsequently, the dimensionality of the data can be reduced by representing (or approximating) each recording as a sparse linear combination of the atoms in the dictionary, for example. As used herein, extraction is an act or process of retrieving data out of data sources for further data processing or storage.

An example application of dictionary learning can be to attenuate random noise. That is, random noise can be attenuated after a sparse approximation because the dimensionality of the random noise cannot be reduced. Some examples of currently available dictionary learning methods include the Methods of Optimal Direction (MOD) approach and the K-mean Singular Value Decomposition (K-SVD) approach.

Dictionary learning and/or denoising can be used to denoise a set of M noisy recordings $\{z_i\}_{i=1}^{M}$ (e.g., traces) of N samples. In this case, the following noise contamination model can be assumed:

$$z_i = y_i + n_i,$$

where each $n_i$ is a zero mean and $\sigma^2$ variance noise vector. It can be assumed that each signal of interest, $y_i$, can be expressed as a linear combination of a smaller number of elementary signals, for example, atoms, from a dictionary. For instance, it can be assumed that there exists an N×K dictionary matrix D with atoms $a_j$, j=1, . . . , K, as its columns and, for each signal, a sparse coefficient vector $x_i$ such that:

$$y_i = Dx_i.$$

As used herein, a sparse coefficient vector includes a one-dimensional array of elements, with a plurality of the elements having values of zero.

Some examples of algorithms for denoising a recording set $\{z_i\}_{i=1}^{M}$ based on dictionary learning methods, for example, the MOD and/or K-SVD, methods are summarized below.

A first phase in such an approach can be an initialization step. For example, an initial dictionary matrix $D_0$ can be constructed such that K recordings are randomly selected from the recording set $\{z_i\}_{i=1}^{M}$, normalized, and placed in the columns of the matrix $D_0$.

A second phase can include an iterative process for one or more stages. In the example of a two-stage iterative process, the stages can consist of: (1) a sparse coding stage, and (2), a dictionary update stage. In the sparse coding stage, the sparse optimization problem:

$$\hat{x}_i = \text{Argmin}_{x_i} \|Dx_i - z_i\|_2^2 \text{ subject to } \|x_i\|_0 < l_i, \quad (1)$$

can be solved for each recording $z_i$. For example, Equation (1) can be approximated using an Orthogonal Matching Pursuit (OMP) algorithm. In the dictionary update stage, the dictionary can be updated by solving:

$$\hat{D} = \text{Argmin}_D \|D\hat{x}_i - z_i\|_2^2, \quad i=1, \ldots, M \quad (2)$$

The problem in Equation (2) can be solved using a pseudo-inverse, as proposed in MOD. Equation (2) can also be solved using singular value decompositions as proposed in K-SVD.

A third phase in the approach can include applying a sparse approximation. For example, an $l_i$ sparse approximation:

$$\hat{y}_i = \hat{D}\hat{x}_i, \quad (3)$$

can be computed for each recording. Here, "$l_i$ sparse approximation" can be used to denote an approximation performed with $l_i$ non-zero coefficients in the dictionary domain. For instance, in Equation (3), $\hat{y}_i$ is an $l_i$-sparse approximation if the vector $\hat{x}_i$ contains $l_i$ non-zero coefficients.

The sparsity constraint depends on the prior variance $\sigma^2$ of the noise such that $l_i$ is the smallest sparsity of $\hat{y}_i$ that satisfies:

$$l_i : \|\hat{y}_i - z_i\|_2^2 \leq N\sigma^2. \quad (4)$$

If the variance of the above approach is known, a dictionary matrix D and a sparse approximation $\{\hat{y}_i\}_{i=1}^M$ the data set $\{z_i\}_{i=1}^M$ where the random noise is attenuated can be determined. If the variance of the noise is not known, but is the same for all noise vectors $n_i$, i=1, ..., M, the variance can be estimated using, for example, an absolute median deviation approximation. Then, using the estimated variance, a dictionary matrix D and a sparse approximation $\{\hat{y}_i\}_{i=1}^M$ of a data set where the random noise is attenuated can be estimated. However, if the variances of the noise vectors are not known and/or vary for different noise vectors, a sparse approximation realized with the criterion in Equation (4) may be inadequate. For example, in the case of seismic data, it may be unrealistic to consider the variance of random seismic noise, such as seismic noise in seismic data, to be constant. As a result, some approaches to applying dictionary learning and/or denoising to attenuating random noise having a spatio-temporally varying variance may be insufficient in applications, for example, applications where the variance of the noise vectors are not known and/or include noise vectors with varying respective variances. In contrast, at least one embodiment of the present disclosure includes dictionary learning and denoising that can attenuate random noise having a spatio-temporally varying variance in seismic data.

In at least one embodiment of the present disclosure, CDLD can attenuate random noise having a spatio-temporally varying variance in seismic data. For example, a noise contamination model of the form:

$$z_i = y_i + \tilde{n}_i,$$

can be used where each noise vector $\tilde{n}_i$ is following a zero mean and unknown variance $\sigma_i^2$ distribution. In at least one embodiment, dictionary learning and denoising can be based on a coherence criterion. The coherence $\mu(x, D)$ of a vector x relative to a given dictionary matrix D can be the maximum of the absolute value of the correlation between the atoms and the normalized version of x. This can be represented mathematically as follows:

$$\mu(x, D) = \max_{j \in S} \left| \left\langle \frac{x}{\|x\|_2}, a_j \right\rangle \right|,$$

where $a_j$ is the atom stored in the j-th column of the dictionary matrix, S is a group containing all the indexes of the atoms present in dictionary (e.g., 1, ..., K), and $\langle (x, y) \rangle$ denotes the correlation between the vectors x and y.

CDLD in accordance with the present disclosure can use an iterative scheme with a different sparse coding stage similar to K-SVD and MOD approaches. For example, the sparsity constraint $l_i$ can be defined as the smallest sparsity such that the coherence of the residuals relative to the dictionary is less than or equal to an expected coherence of a random noise relative to the dictionary. That is, $$l_i : \mu(\hat{y}_i - z_i, D) \leq E\{\mu(\tilde{n}, D)\}.$$

where $E\{X\}$ denotes the expectation of X. As used herein, "expected" means a prediction and/or estimation. Coherence, as used herein, refers to continuity from trace to trace. The sparsest solution such that no coherence can be detected in the residuals $\hat{y}_i - \hat{z}_i$ (e.g., a representation error) can be found. A constant C can also be introduced in the previous equation, such that the sparsity constraint becomes:

$$l_i : \mu(\hat{y}_i - z_i, D) \leq C\, E\{\mu(\tilde{n}, D)\},$$

in order to perform a more aggressive denoising. The value of the constant C can be more than one, and the higher the value of the constant C, the more aggressive the denoising. In at least one embodiment, in an additional derivation, given the criterion in Equation (5) (described further herein), and given that the magnitude of the signal coefficients in $x_i$ are relatively larger, such as by a determinable factor, than the noise standard deviation $\sigma_i$, a signal can be preserved in a statistical sense while the noise can be attenuated.

An expectation of the coherence of random noise relative to a dictionary may not be trivial if there is no prior information regarding the noise. To derive the coherence of random noise relative to a dictionary, $E\{\mu(\tilde{n}, D)\}$, a distribution of the noise can be known and/or determined. For example, $E\{\mu(\tilde{n}, D)\}$ can be derived for Gaussian noise $\tilde{n}$ of variance $\sigma^2$. Since each atom $a_i$ of the dictionary can be normalized and deterministic, for example, seismic wavelet, it can be possible to show that $\langle \tilde{n}, a_i \rangle$ is a following zero mean and $\sigma^2$ variance Gaussian distribution, which can be denoted as:

$$\langle \tilde{n}, a_i \rangle \in \mathcal{N}(0, \sigma^2).$$

For the normalized noise, this equation can become:

$$\left\langle \frac{\tilde{n}}{\|\tilde{n}\|_2}, a_i \right\rangle = \left\langle \frac{\hat{n}}{\sqrt{N}\,\sigma}, a_i \right\rangle \in \mathcal{N}\left(0, \frac{1}{N}\right).$$

Using the definition of the coherence and a property of the correlation between the normalized Gaussian noise and the dictionary, the expectation of the coherence of the Gaussian noise relative to the dictionary can be $$E\{\mu(\tilde{n}, D)\} = \max(\{\|x_i\|\}_{i=0}^K),$$

where $\chi_i$ are random variables such that $$\chi_i \in \mathcal{N}\left(0, \frac{1}{N}\right).$$

For n number of variables $\zeta_i \in N(0, \sigma^2)$, it can be shown that as $n \to \infty$.

$$P\{\max(\{\|\zeta_i\|\}_{i=0}^n) > \sigma\sqrt{2\log(n)}\} \to 0,$$

where P{X} denotes the probability of the variable X. This result can be used to show that as K→∞:

$$P\left\{\max(\{|x_i|\}_{i=0}^{K}) > \sqrt{2\frac{\log(K)}{N}}\right\} \to 0,$$

where $$x_i \in N\left(0, \frac{1}{N}\right).$$

From this result, the expectation of the coherence of a Gaussian noise relative to a dictionary can be bounded as:

$$E\{\mu(n, D)\} \le \sqrt{2\frac{\log(K)}{N}}.$$

In at least one embodiment, the sparsity constraint $l_i$ can be fixed with a smallest sparsity such that:

$$l_i: (\hat{y}_i - z_i, D) \le \sqrt{2\frac{\log(K)}{N}}. \quad (5)$$

Figure 2:
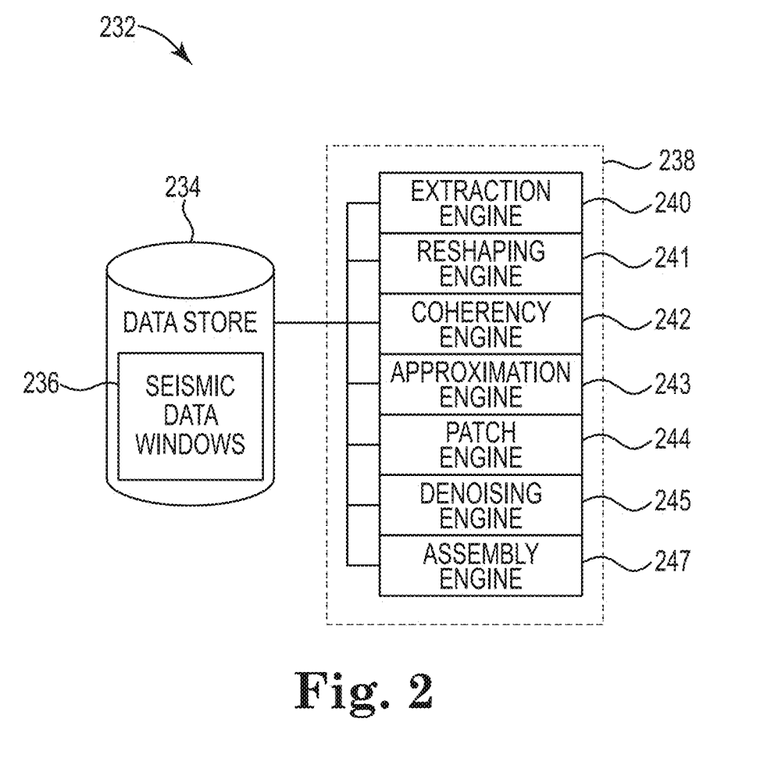
FIG. 2 illustrates a diagram of a system for denoising seismic data.

FIG. 2 illustrates a diagram of a system 232 for analogous processing of modeled and measured marine survey data. The system 232 can include a data store 234, a subsystem 238, and/or a number of engines (e.g., extraction engine 240, reshaping engine 241, coherency engine 242, approximation engine 243, patch engine 244, denoising engine 245, and/or assembly engine 247) and can be in communication with the data store 234 via a communication link. The data store 234 can store seismic data windows 236, which can comprise seismic data with noise having spatio-temporally varying variance. A seismic data window can include a set or sets of seismic data of a particular size. A seismic data window, as used herein, is window of seismic data that is a subpart of the seismic data belonging to a specific range. The range can be defined for a specific time and space range, for example. In a two-dimensional survey example, a seismic data cube is obtained that can be sorted such that the dimensions are time×midpoint×half-offset data cube. As used herein, a seismic data cube comprises a 3D seismic data set. Only a slice of the data cube is displayed. For instance, a common offset gather is displayed. An example can be seen in FIG. 7, which is a 100×100 seismic data window, meaning 100 neighboring samples in time×100 neighboring samples in space.

The system 232 can include additional or fewer engines than illustrated to perform the various functions described herein. The system can represent program instructions and/or hardware of a machine. As used herein, an "engine" can include program instructions and/or hardware, but at least includes hardware. Hardware is a physical component of a machine that enables it to perform a function. Examples of hardware can include a processing resource, a memory resource, a logic gate, etc.

The number of engines can include a combination of hardware and program instructions that is configured to perform a number of functions described herein. The program instructions, such as software, firmware, etc., can be stored in a memory resource such as a machine-readable medium, computer-readable medium, etc., as well as hard-wired program such as logic. Hard-wired program instructions can be considered as both program instructions and hardware.

Figure 5:
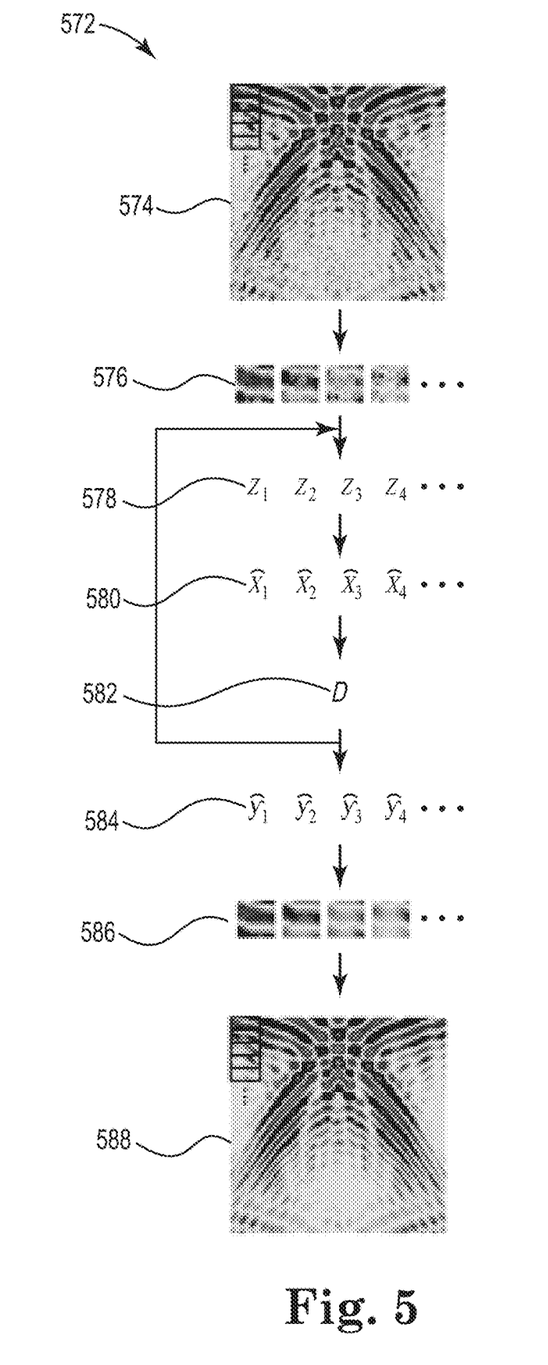
FIG. 5 illustrates images of seismic data windows, images of patches, and vectors associated with a method for denoising seismic data.

The extraction engine 240 can include a combination of hardware and program instructions that is configured to extract a plurality of overlapping patches from the seismic data windows. As used herein, overlapping patches are portions of a seismic data window that overlap with one another. Extracting overlapping patches can allow for capturing all of the seismic data within the seismic data windows. Example overlapping patches are illustrated in FIG. 5. In at least one embodiment, the seismic data windows include a plurality of n-dimensional seismic data windows, where n is a natural number. The plurality of overlapping patches can include all of the patches in each seismic window. The M overlapping patches can be of size $\sqrt{N}\times\sqrt{N}$, and $\sqrt{N}$ can be a natural number. In at least one embodiment, the seismic data windows form a seismic data cube, and the seismic data cube can have dimensions of time×midpoint×half-offset. For example, a time×midpoint×half-offset seismic data cube obtained from a two-dimensional survey for a selected common offset can be divided into 100×100 sample seismic data windows, where 10×10 overlapping patches can be extracted and arranged as vectors. To exploit the three-dimensional coherence of the seismic data, the datasets can be obtained by dividing the data cube into 30×30×30 sample windows where 5×5×5 overlapping cubes can be extracted and arranged as vectors.

The reshaping engine 241 can include a combination of hardware and program instructions that is configured to reshape the plurality of overlapping patches as patch vectors. In at least one embodiment, the patches can be reshaped into M patch vectors of length N to obtain the patch vectors. As used herein, a patch vector is a vector of overlapping patches. For example, a patch vector can be a column vector of overlapping patches. As used herein, reshaping the plurality of overlapping patches includes forming the overlapping patches into a patch vector.

The coherency engine 242 can include a combination of hardware and program instructions that is configured to determine a sparse coefficient vector based on a coherence-based sparse optimization algorithm using a dictionary associated with the patch vectors. For example, for each patch vector, using a dictionary from a previous iteration, a sparse optimization can be performed to find a sparse vector. At a first iteration, an initial dictionary can be constructed with K randomly selected sparse coefficient vectors. With each iteration the dictionary learns and improves. The coherence-based sparse optimization algorithm can include, in at least one embodiment, using Equation (1) as described above with the criterion of Equation (5) as described above.

The approximation engine 243 can include a combination of hardware and program instructions that is configured to compute sparse approximations of the patch vectors using the dictionary and the sparse coefficient vectors. Equation (3) can be used to perform sparse approximations of the patch vectors using a linear combination of a portion of the dictionary. Put another way, the sparse representation of each patch vector can be computed using Equation (3). As used herein, a sparse approximation is a sparse vector that can approximately solve a system of equations. As noted above, with each iteration the dictionary learns, updates, and improves. The dictionary can be improved via a plurality of iterations until a representation of each of the sparse vectors is a desired sparseness. In at least one embodiment, the plurality of iterations can be a fixed number of iterations.

The patch engine 244 can include a combination of hardware and program instructions that is configured to rearrange the plurality of sparse approximations into respective patches. The plurality of sparse approximations can be rearranged into the same number of patches as were extracted from the seismic data windows by the extraction engine 240. For example, each N sample vector $\hat{y}_i$ can be rearranged into a size $\sqrt{N} \times \sqrt{N}$ patch.

The denoising engine 245 can include a combination of hardware and program instructions that is configured to blend and average the respective patches to construct denoised versions of the seismic data windows. For instance, the respective patches can be blended and averaged into a panel at the position of their extractions performed by extraction engine 240. As used herein, averaging includes expressing the respective patches as a central or typical patch of the respective patches. As used herein, blending comprising mixing the respective patches into the panel. In at least one embodiment, the denoised versions of the seismic data windows have the same dimensions as their respective seismic data windows comprising noise having spatio-temporally varying variance. As used herein, a denoised version of a seismic data window can include the denoised version having less noise than the original version. For example, prior to denoising, the seismic data window may have noise that obscures details and hinders seismic image processing. Once denoised, the seismic window can have a smaller amount of noise, improving its usability.

The assembly engine 247 can include a combination of hardware and program instructions that is configured to assemble the denoised versions of the seismic data windows to reconstitute the denoised seismic data. As used herein, reconstituting the denoised seismic data comprises reconstructing the denoised seismic data and/or restoring the denoised seismic data to the format of the seismic data windows. In at least one embodiment, the assembly engine is further configured to taper and average the denoised versions of the seismic data windows in response to the seismic data windows comprising overlapping windows. For example, tapering can include smoothly decaying to zero near the edges of each seismic data window to reduce effects of discontinuity between a beginning and an end of a time series.

In at least one example, denoising seismic data can include the use of a machine that can utilize software, hardware, firmware, and/or logic to perform a number of functions. The machine can be a combination of hardware and program instructions configured to perform a number of functions (e.g., actions). The hardware, for example, can include a number of processing resources and a number of memory resources, such as a machine-readable medium or other non-transitory memory resources. The memory resources can be internal and/or external to the machine, for example, the machine can include internal memory resources and have access to external memory resources. The program instructions, such as machine-readable instructions, can include instructions stored on the machine-readable medium to implement a particular function, for example. The set of machine-readable instructions can be executable by one or more of the processing resources. The memory resources can be coupled to the machine in a wired and/or wireless manner. For example, the memory resources can be an internal memory, a portable memory, a portable disk, and/or a memory associated with another resource, for example, enabling machine-readable instructions to be transferred and/or executed across a network such as the Internet. As used herein, a "module" can include program instructions and/or hardware, but at least includes program instructions.

The memory resources can be non-transitory and can include volatile and/or non-volatile memory. Volatile memory can include memory that depends upon power to store information, such as various types of dynamic random access memory among others. Non-volatile memory can include memory that does not depend upon power to store information. Examples of non-volatile memory can include solid state media such as flash memory, electrically erasable programmable read-only memory, phase change random access memory, magnetic memory, optical memory, and/or a solid state drive, etc., as well as other types of non-transitory machine-readable media.

The processing resources can be coupled to the memory resources via a communication path. The communication path can be local or remote to the machine. Examples of a local communication path can include an electronic bus internal to a machine, where the memory resources are in communication with the processing resources via the electronic bus. Examples of such electronic buses can include Industry Standard Architecture, Peripheral Component Interconnect, Advanced Technology Attachment, Small Computer System Interface, Universal Serial Bus, among other types of electronic buses and variants thereof. The communication path can be such that the memory resources are remote from the processing resources, such as in a network connection between the memory resources and the processing resources. That is, the communication path can be a network connection. Examples of such a network connection can include a local area network, wide area network, personal area network, and the Internet, among others.

The machine-readable instructions stored in the memory resources can be segmented into a number of modules that when executed by the processing resources can perform a number of functions. As used herein a module includes a set of instructions included to perform a particular task or action. The number of modules can be sub-modules of other modules. Furthermore, the number of modules can comprise individual modules separate and distinct from one another.

Each of the number of modules can include program instructions and/or a combination of hardware and program instructions that, when executed by a processing resource, can function as an engine as described with respect to FIG. 2.

In accordance with a number of embodiments of the present disclosure, a geophysical data product can be produced and/or manufactured. The geophysical data product can include, for example, a denoised version of a seismic data window. Geophysical data can be obtained and stored on a non-transitory, tangible computer-readable medium. The geophysical data product can be produced by processing the geophysical data offshore or onshore either within the United States or in another country. If the geophysical data product is produced offshore or in another country, it can be imported onshore to a facility in the United States. In some instances, once onshore in the United States, geophysical analysis can be performed on the geophysical data product. In some instances, geophysical analysis can be performed on the geophysical data product offshore. For example, a plurality of seismic data windows can be processed and denoised versions can be constructed using overlapping patches, offshore to facilitate other processing of the seismic data windows either offshore or onshore. As another example, a plurality of overlapping patches corresponding to each of the plurality of seismic data windows can be extracted and reshaped into patch vectors, offshore to facilitate other processing of the seismic data windows either offshore or onshore. As another example, sparse approximations of the patch vectors based on a dictionary and a sparse coefficient vector can be determined, and the sparse approximations can be reshaped into respective overlapping patches, offshore to facilitate other processing of the seismic data windows offshore or onshore. As used herein, reshaping the sparse approximations includes forming the sparse approximations into respective overlapping patches.

Figure 3:
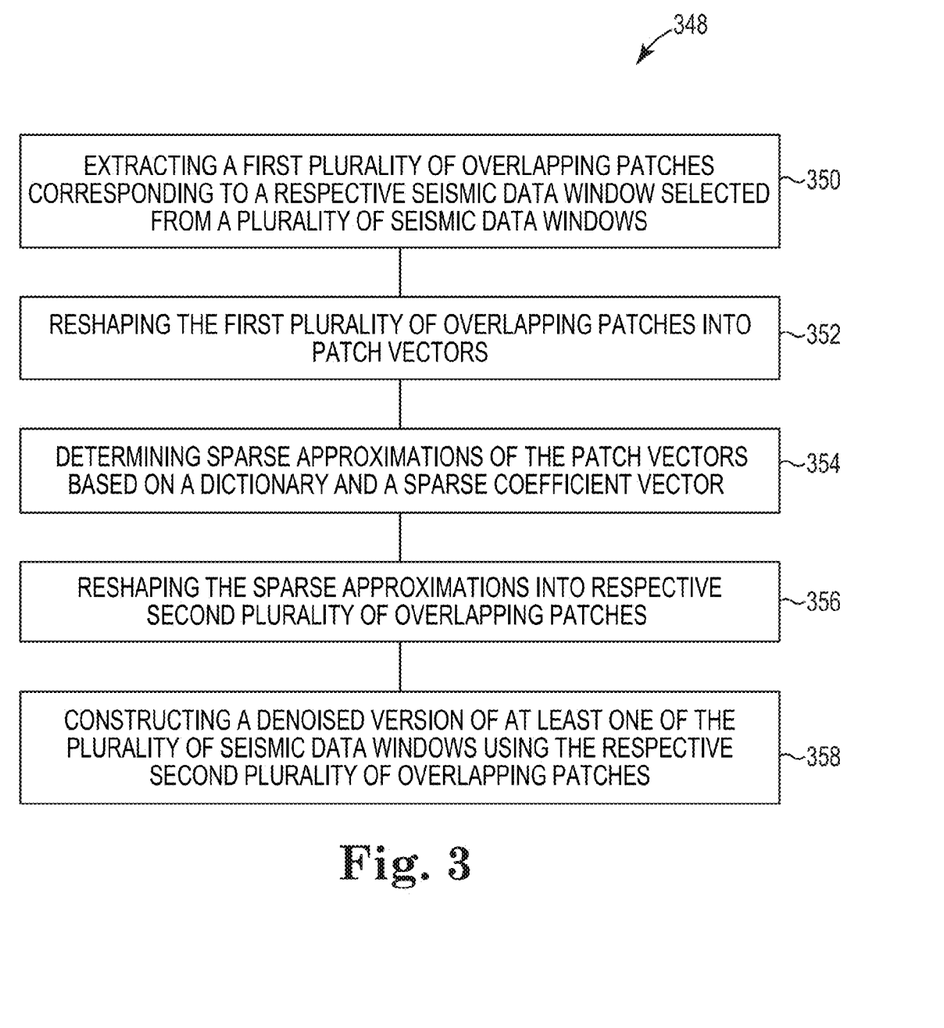
FIG. 3 illustrates a method flow diagram for denoising seismic data.

FIG. 3 illustrates a method flow diagram 348 for denoising seismic data. At 350, the method can include extracting a plurality of first overlapping patches corresponding to a respective seismic data window selected from a plurality of seismic data windows. In at least one embodiment, the method includes extracting the first plurality of overlapping patches corresponding to each of the plurality of seismic data windows, wherein each seismic data window includes noise having a spatio-temporally varying variance. Seismic data can be contaminated with this noise over an entire time and frequency band, hindering seismic imaging from revealing the real subsurface structures.

In at least one embodiment, the method can include dividing seismic data into the plurality of seismic data windows prior to extracting the first plurality of overlapping patches. For example, seismic data can be received, for instance from a receiver. The seismic data can include a plurality of traces, and these traces can be placed within a defined seismic data window.

At 352, the method can include reshaping the first plurality of overlapping patches into patch vectors. The patch vectors, in at least one embodiment, can include M column vectors of length N, which make up a dataset $\{z_i\}_{i=1}^{M}$.

At 354, the method can include determining sparse approximations of the patch vectors based on a dictionary and a sparse coefficient vector. A dictionary from a previous iteration, for instance $D_{k-1}$, can be used to solve a sparse approximation problem for each patch vector. For the first iteration, for instance, $D_0$ can be initialized with patch vectors randomly chosen from patch vectors. Over a plurality of iterations, the dictionary can improve by reducing errors between the patch vectors and their sparse approximations.

In at least one embodiment, the dictionary and the sparse coefficient vector are determined using a coherence-based sparse constraint. For instance, a sparse representation as illustrated in Equation (3) can be determined, and a coherence-based sparse constraint can depend on a prior variance of the noise such that the sparse representation is the smallest sparsity of a patch vector that satisfies Equation (5). Coherence-based sparse constraints, as used herein, are limitations or restrictions with few non-difference constraints. The sparse constraints are dependent on coherency.

In at least one embodiment, the sparse approximations can be determined such that a coherence of a residual is less than and/or equal to a value proportional to an estimated coherence of a noise associated with at least one of the plurality of seismic data windows relative to the dictionary. In at least one embodiment, the sparse approximations can be determined by determining the sparse coefficient vectors to be of length K, and/or the sparse approximations can be determined using the dictionary. For instance, at least one embodiment includes determining the sparse approximations using a dictionary from a previous sparse approximation iteration. For example, for each vector $z_i$, using the dictionary from a previous iteration, a sparse optimization can be performed to find the sparse vector $\hat{x}_i$ of length K. At the first iteration, an initial dictionary can be constructed with K randomly selected vectors from the dataset, and can be solved using Equation (1) and with the criterion in Equation (5).

At 356, the method can include reshaping the sparse approximations into a respective second plurality of overlapping patches. For instance, each sparse approximation can be reshaped into a patch of its original dimension and placed at its location. Because an image may be desired as opposed to a vector, the sparse approximations are reshaped into patches.

At 358, the method can include constructing a denoised version of at least one of the plurality of seismic data windows using the respective second plurality of overlapping patches. The denoised version of the seismic window can be constructed based on an average of the respective second plurality of overlapping patches and/or by blending the respective second plurality of overlapping patches. For example, the respective second plurality of overlapping patches can be averaged, and because the residual noise in each respective overlapping patch can be different, the averaging can be destructive for the noise. Blending the respective second plurality of overlapping patches can allow for a smooth and non-redundant seismic data window, for instance, by removing the overlapping portions. In at least one embodiment, the plurality of seismic data windows can be assembled to reconstitute the seismic data.

Figure 4:
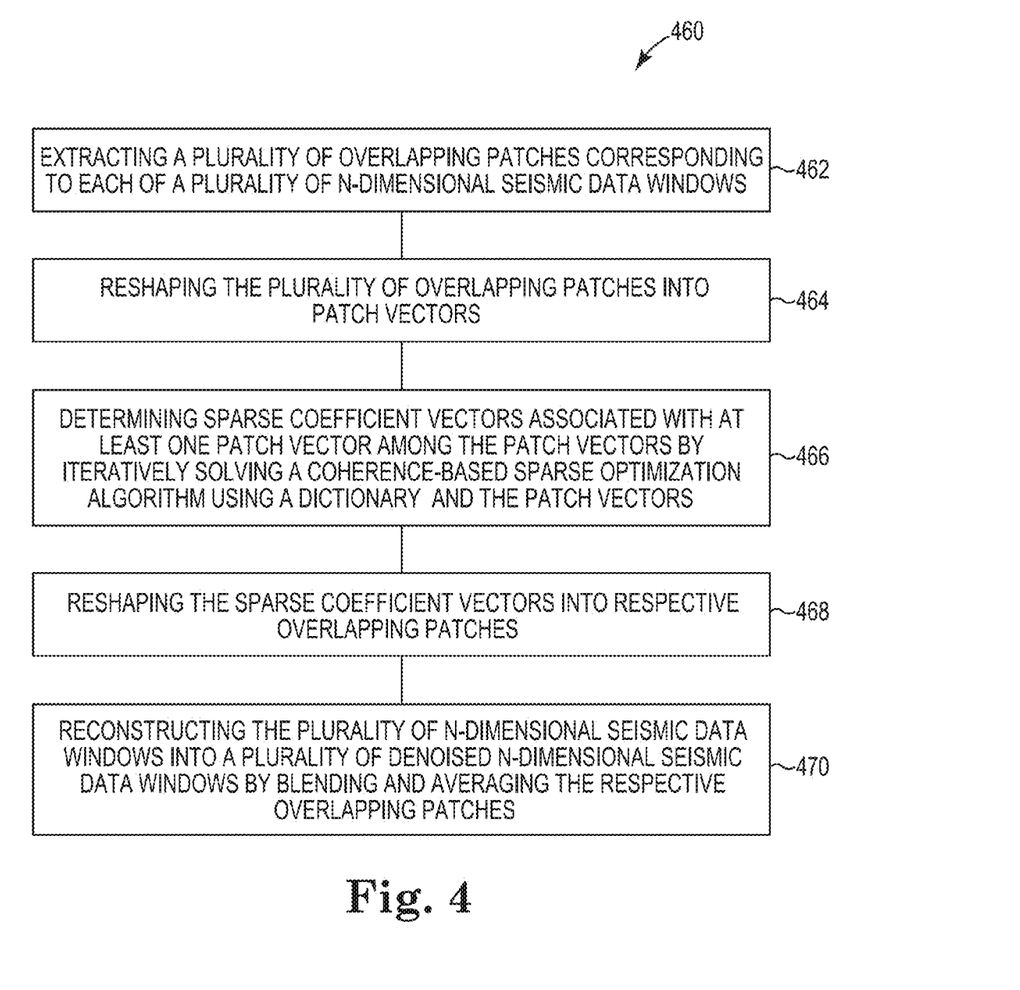
FIG. 4 illustrates a method flow diagram for denoising seismic data.

FIG. 4 illustrates a method flow diagram 460 for denoising seismic data. At 462, the method can include extracting a plurality of overlapping patches corresponding to each of a plurality of n-dimensional seismic data windows. In at least one embodiment, n is a natural number. Put another way, a windowing can be realized to apply CDLD to seismic data. The seismic data can be divided into n-dimensional windows.

At 464, the method can include reshaping the plurality of overlapping patches into patch vectors. The plurality of overlapping patches can be reshaped into M vectors of length N to obtain a dataset $\{z_i\}_{i=1}^{M}$. In at least one embodiment, the overlapping patches can be n-dimensional.

At 466, the method can include determining sparse coefficient vectors associated with at least one patch vector among the patch vectors by iteratively solving a coherence-based sparse optimization algorithm using a dictionary and the patch vectors. For example, a CDLD approach in accordance with the present disclosure can be applied on each vector dataset $\{z_i\}_{i=1}^{M}$ outputting $\{\hat{y}_i\}_{i=1}^{M}$, which is a sparse representation and/or approximation, for example, a denoised version, of the dataset.

At 468, the method can include reshaping the sparse coefficient vectors into respective overlapping patches. For example, each vector $\hat{y}_i$ can be reshaped into a patch of its original dimension and placed at its original location. At 470, the method can include reconstructing the plurality of n-dimensional seismic data windows into a plurality of denoised n-dimensional seismic data windows by blending and averaging the respective overlapping patches, and in at least one embodiment, the method can further include assembling the reconstructed plurality of n-dimensional seismic data windows to reconstitute seismic data. As used herein, reconstructing the plurality of n-dimensional seismic data windows comprises rebuilding the plurality of n-dimensional seismic data windows into the plurality of denoised n-dimensional seismic data windows.

In at least one embodiment, the method can further include iteratively updating a dictionary matrix with the dictionary. For instance, the dictionary can be used to perform a sparse optimization to find sparse vector $\hat{x}_i$, and through subsequent iterations, the dictionary can be updated. Using Equation (2), an N×K dictionary matrix can be computed and updated within the dictionary. The dictionary can be further updated by iteratively performing the sparse optimization and calculating the N×K dictionary matrix.

FIG. 5 illustrates images of seismic data windows, images of patches, and vectors associated with a method for denoising seismic data. A seismic data window is illustrated at 574. The seismic data window can be divided into n-dimensional patches, illustrated as the rectangles within upper left portion of the seismic data window. Overlapping patches may be extracted in at least one embodiment. These overlapping patches are illustrated at 576. For instance, M overlapping patches containing N samples can be extracted, and M can be all of the patches within the seismic data window. In at least one embodiment, the patches can be n-dimensional. The patches can be reshaped, for instance lexicographically reshaped, into M vectors of length N to obtain a dataset $\{z_i\}_{i=1}^{M}$. These vectors are illustrated at 578. For each vector $z_i$, using the dictionary from a previous iteration, a sparse optimization can be performed to find the sparse vector $\hat{x}_i$ of length K. These vectors $\hat{x}_i$ are illustrated at 580. At a first iteration, an initial dictionary can be constructed with K randomly selected vectors from the dataset. Using a CDLD approach in accordance with the present disclosure, this can be solved using Equation (1) and with the criterion in Equation (5).

D, representing a dictionary, is illustrated at 582. Dictionary D can include an N×K dictionary matrix and can be computed using Equation (2). In at least one embodiment, for a fixed number of iterations, the computations associated with vectors 580 dictionary 582 can be reiterated to learn an improved dictionary. In at least one embodiment, computations associated with vectors 578, 580, and dictionary 582 can be reiterated to learn an improved dictionary. Following the reiterations, a sparse representation 584 (illustrated as vectors $\hat{y}_i$) of each vector of vectors 580 can be computed using Equation (3). For example, in at least one embodiment, a CDLD approach in accordance with the present disclosure can be applied to each dataset $\{z_i\}_{i=1}^{M}$ to output $\{\hat{y}_i\}_{i=1}^{M}$, which can be a sparse representation and/or approximation, for example, a denoised version, of the dataset.

Each N sample vector $\hat{y}_i$ can be reshaped into a $\sqrt{N} \times \sqrt{N}$ sized patch. Those patches are illustrated at 586. For example, each vector $\hat{y}_i$ can be reshaped into a patch of its original dimension and can be placed at a respective location. The patches can be blended and averaged into a panel at the position of their divisions (at 576) to reconstruct a denoised version of the original seismic data window. The denoised version of the seismic window is illustrated at 588. The patches illustrated at 586 are shown in the seismic window of 588 in the upper left portion of the seismic window. Because the residual noise in each sample can be different, the averaging can be deconstructive for the noise. In at least one embodiment, seismic data windows can be assembled to reconstitute the seismic data. The seismic window illustrated at 588 has less noise than that of the seismic window illustrated at 574. For instance, the seismic window illustrated at 588 has a lesser amount of dark spots present, which can represent seismic noise.

Figure 6:
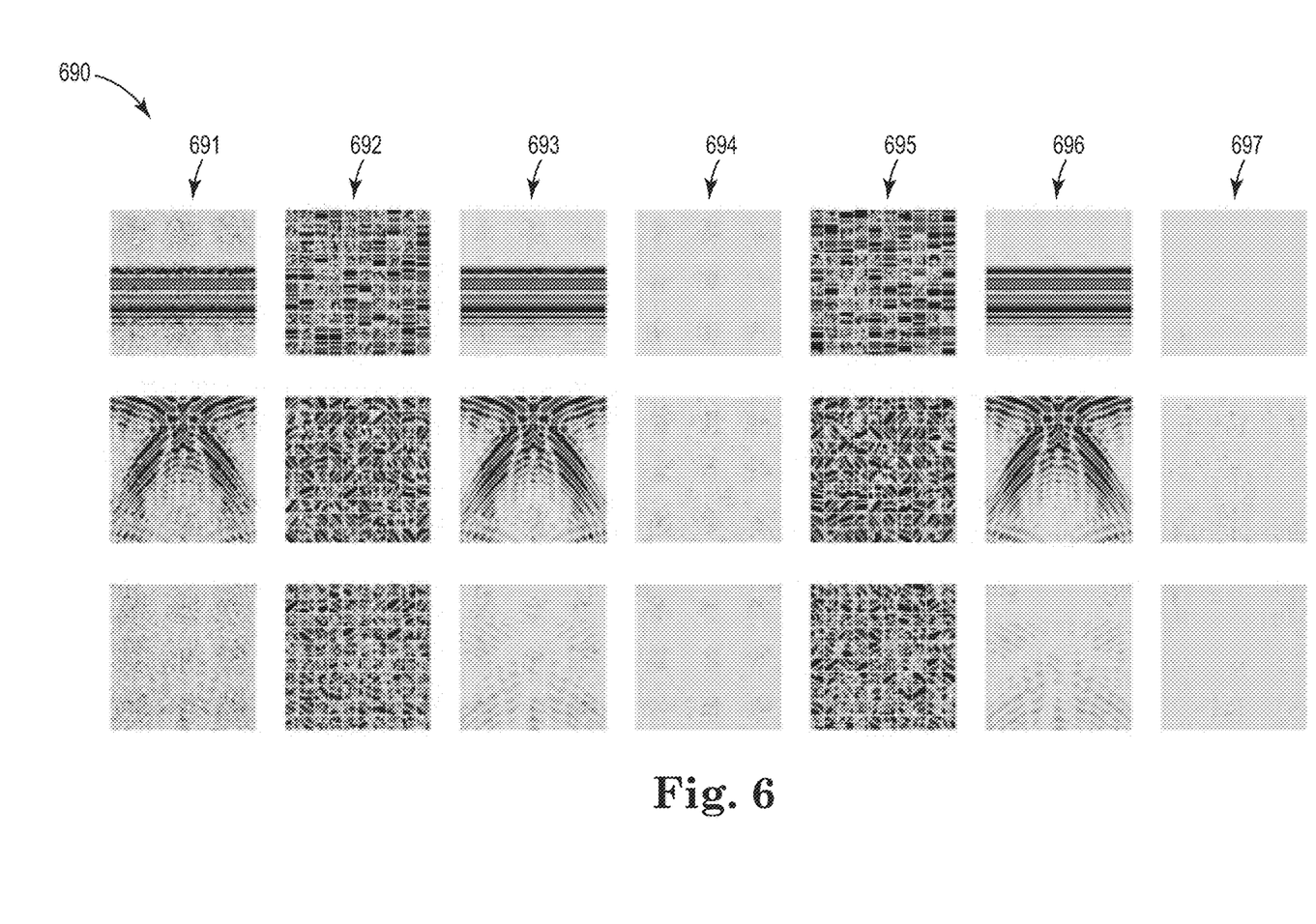
FIG. 6 illustrates images of synthetic data associated with a method for denoising seismic data.

FIG. 6 illustrates images 690 of synthetic data associated with a method for denoising seismic data. In at least one embodiment, a CDLD approach can be applied to synthetic data as illustrated in FIG. 6. FIG. 6 illustrates filtering of noise having spatio-temporally varying variance. Column 691 illustrates seismic data windows including noisy seismic data, column 692 illustrates seismic data windows comprising K-SVD dictionaries, and column 693 illustrates seismic data windows including seismic data denoised using the K-SVD dictionaries of column 692. For example, the seismic data windows illustrated in column 691 have been denoised, resulting in the denoised seismic data windows of column 693. Column 694 illustrates errors resulting from the denoising of the seismic data windows of column 691 via the K-SVD dictionaries of column 692. Each seismic data window of column 692 (and column 695 discussed below) is a dictionary, with each tile representing an atom of the dictionary. In the examples of columns 692 and 695, each dictionary has 100 atoms. One tile can be one atom displayed as a 10×10 patch. In at least one embodiment, the order of the atoms is not relevant.

Column 695 illustrates seismic data windows comprising CDLD dictionaries, and column 696 illustrates seismic data windows including seismic data windows including seismic data denoised using the CDLD dictionaries of column 695. For example, the seismic data windows illustrated in column 691 have been denoised, resulting in the denoised seismic data windows of column 696. Column 697 illustrates errors resulting from the denoising of the seismic data windows of column 691 via the CDLD dictionaries of column 695.

The rows illustrated in FIG. 6 correspond to one another. For instance, the top row is a progression of denoised-seismic data from column 691 to column 692 to column 693. The errors in column 694 illustrated in the top row are associated with the previous row progression described. Similarly, the top row is a progression of denoised-seismic data from column 691 to column 695 to column 696. The errors in column 697 illustrated in the top row are associated with the previous row progression described. The middle and bottom rows follow the same progressions.

Gaussian noise with an amplitude that has been modified with a cosine function can be added to one or more seismic data windows from a pre-stack synthetic common offset gather. For example, Gaussian noise with an amplitude that has been modified with a cosine function can be added to the three different seismic data windows illustrated in column 691 from a pre-stack synthetic common offset gather. The example seismic data windows of column 691 can include an x-axis of spatial dimension, and a y-axis of time, illustrating the seismic data windows including noise having spatio-temporally varying variance. In the examples of FIG. 6, it is known that the signal-to-noise ratio (SNR) in the top seismic data window of column 691 is higher than the other seismic data windows of column 691, and the seismic signal has a linear feature. The SNR can quantitatively assess denoising. For instance, for a given data $\hat{d}$, and its noise-free reference $d_{ref}$, the SNR expressed in decibels can be defined as:

$$SNR(\hat{d}, d_{ref}) = 10 \log \frac{\|d_{ref}\|_2^2}{\|d_{ref} - \hat{d}\|_2^2}.$$

A higher SNR can result in improved denoising.

The middle seismic data window of column 691 includes complex signal structures, and the bottom seismic data window of column 691 includes data having a low SNR as compared to the other seismic data windows of column 691.

As noted above, column 692 includes dictionaries that can be used in K-SVD approaches. The standard deviation that may be required for K-SVD sparsity constraint criterion can be computed on the seismic data windows of column 691, which include only synthetic noise. In contrast to the dictionaries of column 692, the dictionaries of column 695 can use coherence-based dictionary learning while denoising the seismic data windows of column 691.

As illustrated in FIG. 6, denoising seismic data windows in accordance with the present disclosure can be comparatively more accurate with respect to SNR enhancement than a K-SVD approach. For example, residual errors including a difference between denoised and noise-free data can show comparatively more coherence using a K-SVD denoising approach (e.g., column 694) as opposed to denoising in accordance with the present disclosure (e.g., column 697). Coherence can include signal removed in at least one embodiment. For instance, column 693 includes multiple visible errors within the seismic data windows, while column 697 illustrates fewer visible errors within the seismic data windows. The errors in columns 694 and 697 are represented by the spots of darkness within the seismic data windows. Examples of the present disclosure can preserve a signal in seismic data while attenuating spatio-temporally varying noise comparatively better than a K-SVD approach, for example.

Figure 7:
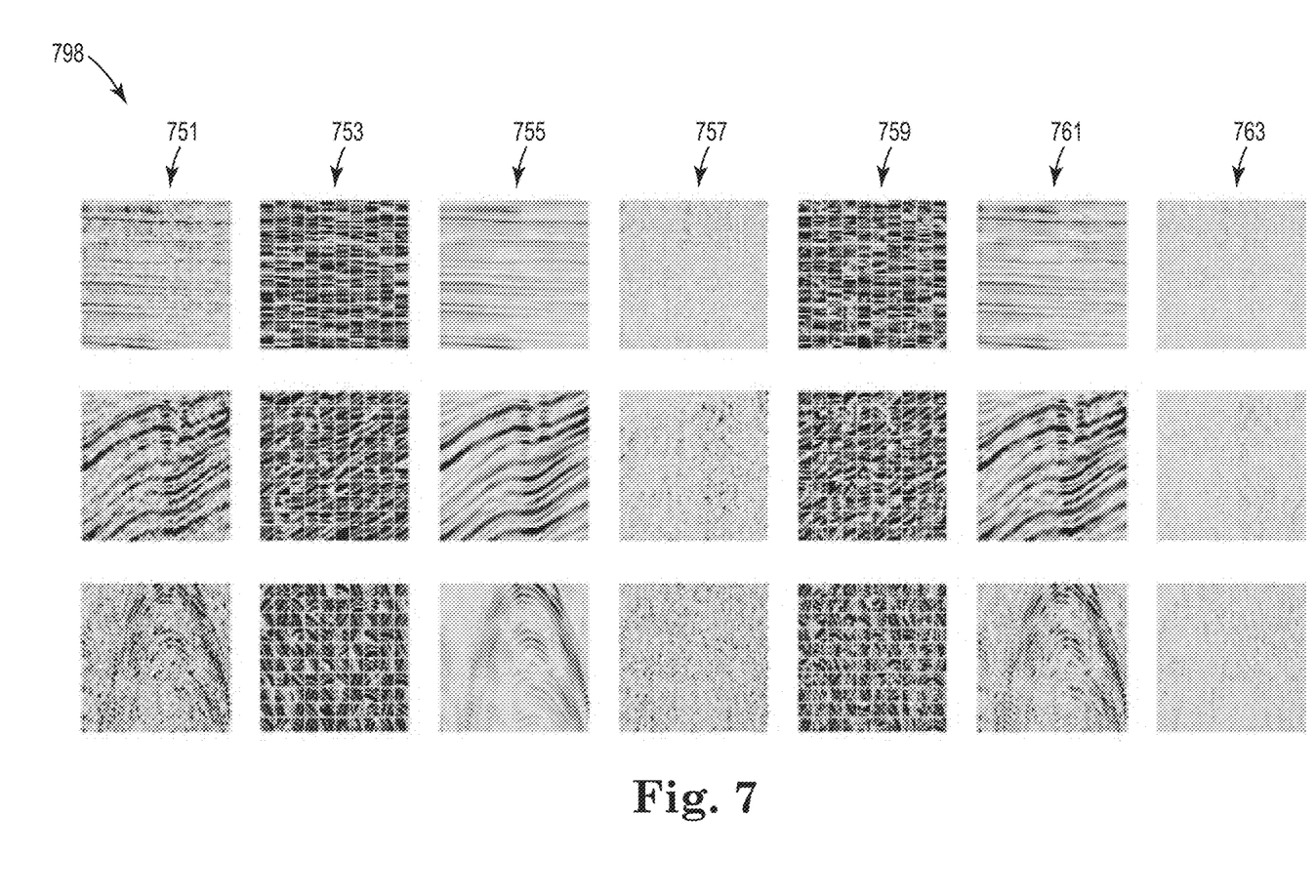
FIG. 7 illustrates images of observed data associated with a method for denoising seismic data.

FIG. 7 illustrates images 798 of observed data associated with a method for denoising seismic data. Diagram 798 includes columns similar to those in FIG. 6; however the seismic data of FIG. 7 includes observed data. As used here, observed day includes field data and/or data recorded during a seismic acquisition. FIG. 7, similarly to FIG. 6, illustrates filtering of noise having spatio-temporally varying variance. For example, column 751 can include three seismic data windows from a common offset gather. The example seismic data windows of column 751 can include an x-axis of spatial dimension and a y-axis of time, illustrating the seismic data windows including noise having spatio-temporally varying variance. Put another way, column 751 illustrates seismic data windows including noisy seismic data. Column 753 illustrates seismic data windows comprising K-SVD dictionaries, and column 755 illustrates seismic data windows including seismic data denoised using the K-SVD dictionaries of column 753. For example, the seismic data windows illustrated in column 751 have been denoised, resulting in the denoised seismic data windows of column 755. Column 757 illustrates noise removed from the seismic data windows of 751 during the K-SVD approach. A standard deviation for a K-SVD sparsity constraint can be estimated by a median absolute deviation.

Column 759 illustrates seismic data windows comprising CDLD dictionaries, and column 761 illustrates seismic data windows including seismic data windows including seismic data denoised using the CDLD dictionaries of column 759. For example, the seismic data windows illustrated in column 751 have been denoised, resulting in the denoised seismic data windows of column 761. Column 763 illustrates noise removed from the seismic data windows of 751 during the CDLD approach using the dictionaries of column 759. In contrast to the dictionaries of column 753, the dictionaries of column 759 can use coherence-based dictionary learning while denoising the seismic data windows of column 751.

Each seismic data window of column 753 and 759 is a dictionary, with each tile representing an atom of the dictionary. In the examples of columns 753 and 759, each dictionary has 100 atoms. One tile can be one atom displayed as a 10×10 patch. In at least one embodiment, the order of the atoms is not relevant.

The rows illustrated in FIG. 7 correspond to one another. For instance, the top row is a progression of denoised-seismic data from column 751 to column 753 to column 755. The removed seismic noise in column 757 illustrated in the top row is associated with the previous row progression described. Similarly, the top row is a progression of denoised-seismic data from column 751 to column 759 to column 761. The removed seismic noise in column 763 illustrated in the top row is associated with the previous row progression described. The middle and bottom rows follow the same progressions.

As noted above, column 757 illustrates seismic noise that has been removed using a KSVD dictionary, and column 763 illustrates seismic noise removed using a CDLD dictionary. However, in column 757, coherency can be seen, for instances as dark spots in the seismic data windows. This illustrates that a portion of the signal has been removed during KSVD denoising, which means the KSVD denoising did not preserve the signal and was not adapted. As such, the KSVD approach does not denoise as well as a CDLD approach in accordance with the present disclosure. For instance, denoising in accordance with the present disclosure can adapt to varying noise and preserve a signal, in contrast to the K-SVD approach, which results in the signal removed from the recordings.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Various advantages of the present disclosure have been described herein, but embodiments can provide some, all, or none of such advantages, or can provide other advantages.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:
1. A method, comprising:
 extracting from a data store a first plurality of overlapping patches corresponding to a respective seismic data window selected from a plurality of seismic data windows of seismic data gathered during a marine seismic survey;
 reshaping the first plurality of overlapping patches into patch vectors;

determining sparse approximations of the patch vectors based on a dictionary and a sparse coefficient vector using a coherence-based sparse constraint;

reshaping the sparse approximations into a respective second plurality of overlapping patches;

constructing denoised versions of at least two of the plurality of seismic data windows using the respective second plurality of overlapping patches, wherein the denoised versions of the seismic data windows have same dimensions as their respective seismic data windows comprising noise having spatio-temporally varying variance; and assembling the denoised versions of the plurality of the seismic data windows to reconstitute a denoised seismic data, wherein the reconstituted denoised seismic data is an improvement over the seismic data such that the reconstituted denoised seismic data less noise than the seismic data; and wherein the reconstituted denoised seismic data is used to create an image better indicative of a subterranean formation as compared to an image created with the seismic data.

2. The method of claim 1, wherein each seismic data window includes noise having a spatio-temporally varying variance.

3. The method of claim 1, further comprising dividing seismic data to define the plurality of seismic data windows prior to extracting the first plurality of overlapping patches.

4. The method of claim 1, further comprising constructing the denoised version of the seismic window based on an average of the respective second plurality of overlapping patches.

5. The method of claim 1, further comprising determining the sparse approximations such that a coherence of a residual is equal to a value proportional to an estimated coherence of a noise associated with at least one of the plurality of seismic data windows relative to the dictionary.

6. The method of claim 1, further comprising determining the sparse approximations such that a coherence of a residual is less than a value proportional to an estimated coherence of a random noise associated with at least one of the plurality of seismic data windows relative to the dictionary.

7. The method of claim 1, further comprising determining the sparse approximations by determining the sparse coefficient vector to be of length K.

8. The method of claim 1, further comprising constructing the denoised seismic window by blending the respective second plurality of overlapping patches.

9. The method of claim 1, wherein determining the sparse approximations using the dictionary comprises determining the sparse approximations using a dictionary from a previous sparse approximation iteration.

10. A method, comprising:
extracting from a data store a plurality of overlapping patches corresponding to each of a plurality of n-dimensional seismic data windows of seismic data gathered during a marine seismic survey;

reshaping the plurality of overlapping patches into patch vectors;

determining sparse coefficient vectors associated with at least one patch vector among the patch vectors by iteratively solving a coherence-based sparse optimization algorithm using a dictionary and the patch vectors;

reshaping the sparse coefficient vectors into respective overlapping patches;

reconstructing the plurality of n-dimensional seismic data windows into a plurality of denoised n-dimensional seismic data windows by blending and averaging the respective overlapping patches, wherein denoised versions of the seismic data windows have same dimensions as their respective seismic data windows comprising noise having spatio-temporally varying variance; and assembling the reconstructed plurality of the denoised n-dimensional seismic data windows to reconstitute the denoised seismic data, wherein the reconstituted denoised seismic data is an improvement over the seismic data such that the reconstituted denoised seismic data less noise than the seismic data; and wherein the reconstituted denoised seismic data is used to create an image better indicative of a subterranean formation as compared to an image created with the seismic data.

11. The method of claim 10, further comprising reshaping the plurality of overlapping patches into M vectors of length N to obtain a dataset $\{z_i\}_{i=1}^{M}$.

12. The method of claim 10, further comprising iteratively updating a dictionary matrix with the dictionary.

13. The method of claim 10, further comprising extracting the plurality of overlapping patches corresponding to each of the plurality of n-dimensional seismic data windows, wherein n is a natural number.

14. A system, comprising:
a data store storing seismic data windows of seismic data comprising noise having spatiotemporally varying variance;

an extraction hardware engine configured to extract a plurality of overlapping patches from the seismic data windows;

a reshaping hardware engine configured to reshape the plurality of overlapping patches as patch vectors;

a coherence hardware engine configured to determine a sparse coefficient vector based on a coherence-based sparse optimization algorithm using a dictionary associated with the patch vectors;

an approximation hardware engine configured to compute sparse approximations of the patch vectors using the dictionary and the sparse coefficient vectors;

a patch hardware engine configured to rearrange the plurality of sparse approximations into respective patches;

a denoising hardware engine configured to blend and average the respective patches to construct denoised versions of the seismic data windows, wherein the denoised versions of the seismic data windows have same dimensions as their respective seismic data windows comprising noise having spatio-temporally varying variance; and an assembly hardware engine configured to assemble the denoised versions of the seismic data windows to reconstitute the denoised seismic data, wherein the reconstituted denoised seismic data is an improvement over the seismic data such that the reconstituted denoised seismic data less noise than the seismic data.

15. The system of claim 14, wherein the assembly hardware engine is further configured to taper and average the denoised versions of the seismic data windows in response to the seismic data windows comprising overlapping windows.

16. The system of claim 14, wherein the seismic data windows include a plurality of n-dimensional seismic data windows, wherein n is a natural number.

17. The system of claim 14, wherein the seismic data windows form a seismic data cube.

18. The system of claim 17, wherein the seismic data cube has dimensions of time×midpoint×half-offset.

19. The system of claim 14, wherein the overlapping patches have a size of $\sqrt{N} \times \sqrt{N}$, wherein $\sqrt{N}$ is a natural number.

20. The system of claim 14, wherein the reshaping hardware engine is further configured to reshape the plurality of overlapping patches as column vectors.

21. The system of claim 14, further comprising a matrix hardware engine configured to compute a dictionary matrix associated with the dictionary.

22. A method to manufacture a geophysical data product, the method comprising:
   obtaining geophysical data; and
   processing the geophysical data to generate the geophysical data product, wherein processing the geophysical data comprises:
   extracting from a data store a first plurality of overlapping patches corresponding to a respective seismic data window selected from a plurality of seismic data windows of seismic data gathered during a marine seismic survey;
   reshaping the first plurality of overlapping patches into patch vectors;
   determining sparse approximations of the patch vectors based on a dictionary and a sparse coefficient vector using a coherence-based sparse constraint;
   reshaping the sparse approximations into a respective second plurality of overlapping patches;
   constructing denoised versions of at least two of the plurality of seismic data windows using the respective second plurality of overlapping patches, wherein the denoised versions of the seismic data windows have same dimensions as their respective seismic data windows comprising noise having spatio-temporally varying variance; and
   assembling the denoised versions to reconstitute the denoised seismic data, wherein the reconstituted denoised seismic data is an improvement over the seismic data such that the reconstituted denoised seismic data less noise than the seismic data; and
   recording the geophysical data product on a non-transitory machine-readable medium.

23. The method of claim 22, wherein processing the geophysical data comprises processing the geophysical data offshore or onshore.

24. The method of claim 22, further comprising using the reconstituted seismic data to create an image better indicative of a subterranean formation as compared to an image created with the seismic data.

* * * * *

UNITED STATES PATENT AND TRADEMARK OFFICE
CERTIFICATE OF CORRECTION

PATENT NO. : 10,436,924 B2
APPLICATION NO. : 15/265072
DATED : October 8, 2019
INVENTOR(S) : Pierre Turquais et al.

It is certified that error appears in the above-identified patent and that said Letters Patent is hereby corrected as shown below:

In the Claims

In Claim 1, at Column 17, Line 18 please insert --has-- between "reconstituted denoised sesimic data" and "less noise".

In Claim 10, at Column 18, Line 14 please insert --has-- between "reconstituted denoised sesimic data" and "less noise".

In Claim 14, at Column 18, Line 61 please insert --has-- between "reconstituted denoised sesimic data" and "less noise".

In Claim 22, at Column 20, Line 17 please insert --has-- between "reconstituted denoised sesimic data" and "less noise".

Signed and Sealed this
Seventh Day of April, 2020

Andrei Iancu
*Director of the United States Patent and Trademark Office*